Patented Dec. 16, 1930

1,785,147

UNITED STATES PATENT OFFICE

WILLIAM KENMORE SCHWEITZER, OF CLEVELAND, OHIO, ASSIGNOR TO THE GRASSELLI CHEMICAL COMPANY, OF CLEVELAND, OHIO, A CORPORATION OF DELAWARE

SULPHONATED MINERAL OILS AS ADDITION AGENTS TO ZINC-CHLORIDE-BASE FLUXES

No Drawing.   Application filed December 26, 1929. Serial No. 416,759.

Zinc chloride is the base of a large number of soft soldering flux compositions, which consist usually of aqueous or dilute alcoholic solutions of zinc chloride containing various other ingredients, such as ammonium chloride, hydrochloric acid, fusel oils, etc. Such fluxes are sufficiently efficient for general, all around soldering work on cleaned metal, but on complicated or rough surfaced metal pieces, which are difficult to clean from oil and grease, they do not always perform to best advantage.

I have found that zinc chloride base fluxes containing a relatively small amount of a sulphonated mineral oil have the property of wetting and spreading over metal pieces, whereby they allow the solder to reach into the irregularities and corners or recesses of the metal pieces to be united. I also found that they seem to "cut through" any film of oil or grease which may be present on the metal articles, and my invention comprises the novel, compounded zinc chloride fluxes and their application in soft soldering.

Sulphonated mineral oils are obtained as by-products in various petroleum refining operations. They are also sometimes produced directly by sulphonation of refined, higher boiling mineral oil fractions and such products have various technical uses. Similarly, shale oils of high sulfur content are sulphonated to produce sulphonated mineral oils which have certain therapeutical properties. These sulphonated mineral oils are water soluble as such, or at least in the form of their ammonium and alkali metal salts. The free acids are usually viscous liquids of more or less dark color.

The addition as spreaders of these various types of sulphonated mineral oils and their salts to zinc chloride base fluxes is contemplated in the preparation of the compounded fluxes of my invention.

Only relatively small amounts of the sulphonated mineral oil compounds are needed in zinc chloride fluxes to improve their spreading properties. From fractions of 1 per cent, for instance 1/10, 1/4, 1/2, etc. to a few per cent is usually sufficient to develop the desirable properties, though larger proportions could be used without detriment. The sulphonated mineral oils have in the absence of zinc chloride at the best only slight fluxing properties, as for instance, on tin plate. When added to zinc chloride fluxes they do, however, particularly in aqueous-alcoholic solution, produce a better contact between the zinc chloride, solder and metal pieces to be united, their action being to wet and spread the zinc chloride and solder over the metal pieces.

The preparation of my novel compounded fluxes comprises merely adding the desired amount of sulphonated mineral oil to the zinc chloride base fluxes, forming usually a homogeneous solution, but where the sulphonated mineral oil is not sufficiently soluble in the flux, it can be incorporated therein by merely shaking the two together, obtaining thereby an emulsion or suspension which acts just as well as a true solution. Most zinc chloride base fluxes are acid and it is therefore immaterial if the free acid or their salts are added to the flux.

The following are a few examples of compounded fluxes under my invention:

(1)

|  | Parts by weight |
|---|---|
| Zinc chloride solution 70% | 350 |
| Hydrochloric acid 20° Bé | 350 |
| Alcohol (denatured) | 100 |
| Ammonium chloride | 25 |
| Water | 175 |
| Sulphonated mineral oil containing about 14% sulphur | 1 |

This flux had about 8 times the spread of a similar flux with the sulphonated mineral oil omitted.

(2)

|  | Parts by weight |
|---|---|
| Zinc chloride, 70% solution | 50 |
| Hydrochloric acid 20° Bé | 23 |
| Alcohol | 25 |
| Ammonium chloride | 2 |
| Sulphonated high boiling petroleum | 1 |

This flux had about 5 times the spread of a similar flux containing no sulphonated mineral oil.

(3)

| | Parts by weight |
|---|---|
| Zinc chloride, 70% solution | 378 |
| Hydrochloric acid 20° Bé | 360 |
| Ammonium chloride | 35 |
| Water | 227 |
| Sulphonated mineral oil (same as in Example 2) | ½ |

This flux had also an excellent spread, nearly 3 times that of the same flux without the sulphonated mineral oil.

Similarly, zinc chloride base fluxes of other compositions and containing a small amount of a sulphonated mineral oil show excellent spread and wetting power.

The compounded fluxes of my invention are used in soft soldering operations in substantially the same general manner as ordinary zinc chloride fluxes, and the slight modification in the soldering technique which the use of my novel fluxes might require is entirely within the knowledge and practice of those skilled in the soldering art.

I claim:

1. As a new composition of matter a soldering flux comprising zinc chloride and a sulphonated mineral oil.

2. As a new composition of matter a soldering flux comprising zinc chloride solution and a sulphonated mineral oil.

3. As a new composition of matter a soldering flux comprising an alcoholic-aqueous zinc chloride solution and a sulphonated mineral oil.

4. In a process of soft soldering metals the step of applying a zinc chloride flux containing a sulphonated mineral oil.

In testimony whereof, I affix my signature.

WILLIAM KENMORE SCHWEITZER.